US008700706B2

(12) United States Patent
Kowalewski

(10) Patent No.: US 8,700,706 B2
(45) Date of Patent: Apr. 15, 2014

(54) METHOD FOR DETERMINING ACTIVE COMMUNICATION SESSIONS AND COMMUNICATION SESSION INFORMATION SERVER

(75) Inventor: Frank Kowalewski, Goettingen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 187 days.

(21) Appl. No.: 12/999,316

(22) PCT Filed: Jun. 5, 2009

(86) PCT No.: PCT/EP2009/056974
§ 371 (c)(1),
(2), (4) Date: Dec. 16, 2010

(87) PCT Pub. No.: WO2009/153176
PCT Pub. Date: Dec. 23, 2009

(65) Prior Publication Data
US 2011/0093537 A1 Apr. 21, 2011

(30) Foreign Application Priority Data
Jun. 19, 2008 (DE) .......................... 10 2008 029 142

(51) Int. Cl.
*G06F 15/16* (2006.01)
(52) U.S. Cl.
USPC ........... 709/204; 709/203; 709/205; 709/206; 709/207
(58) Field of Classification Search
USPC .................................................. 709/203–207
See application file for complete search history.

(56) References Cited

U.S. PATENT DOCUMENTS 6,665,392 B1 12/2003 Wellner et al.
6,772,436 B1 8/2004 Doganata et al.
7,155,480 B2 12/2006 Byrisetty et al.

(Continued)

FOREIGN PATENT DOCUMENTS

| GB | 2430109 A | 3/2007 |
|---|---|---|
| KR | 20040078872 A | 9/2004 |
| KR | 1020040091231 A | 10/2004 |
| WO | 9535621 A1 | 12/1995 |

OTHER PUBLICATIONS

English language translation for KR 20040078872.

(Continued)

*Primary Examiner* — Wing F Chan
*Assistant Examiner* — Padma Mundur

(57) ABSTRACT

A method for ascertaining active communication sessions may include receiving a request to ascertain active communication sessions by a communication session information server; transmitting respective challenges to determine whether communication sessions are currently active from the communication session information server to at least two communication session servers; receiving respective challenge responses from the at least two communication session servers, which indicate one or more active communication sessions controlled by the respective communication session server or indicate that such communication sessions currently do not exist, by the communication session information server; and transmitting a first response, which indicates one or more active communication sessions controlled by the at least two communication session servers or indicates that such communication sessions currently do not exist, by the communication session information server.

24 Claims, 5 Drawing Sheets

(56) References Cited

U.S. PATENT DOCUMENTS

| | | | |
|---|---|---|---|
| 2002/0174171 A1* | 11/2002 | Byrisetty et al. | 709/203 |
| 2003/0153340 A1 | 8/2003 | Crockett et al. | |
| 2004/0205175 A1* | 10/2004 | Kammerer | 709/223 |
| 2005/0260976 A1 | 11/2005 | Khartabil et al. | |
| 2007/0026883 A1* | 2/2007 | Sung et al. | 455/518 |
| 2007/0071210 A1 | 3/2007 | Schmidt et al. | |
| 2007/0127374 A1 | 6/2007 | Black | |
| 2008/0003999 A1 | 1/2008 | Sung et al. | |

OTHER PUBLICATIONS

International Search Report of PCT/EP2009/056974 mailed on Sep. 8, 2009.

English language abstract of KR 1020040091231 A dated Oct. 28, 2004.

* cited by examiner

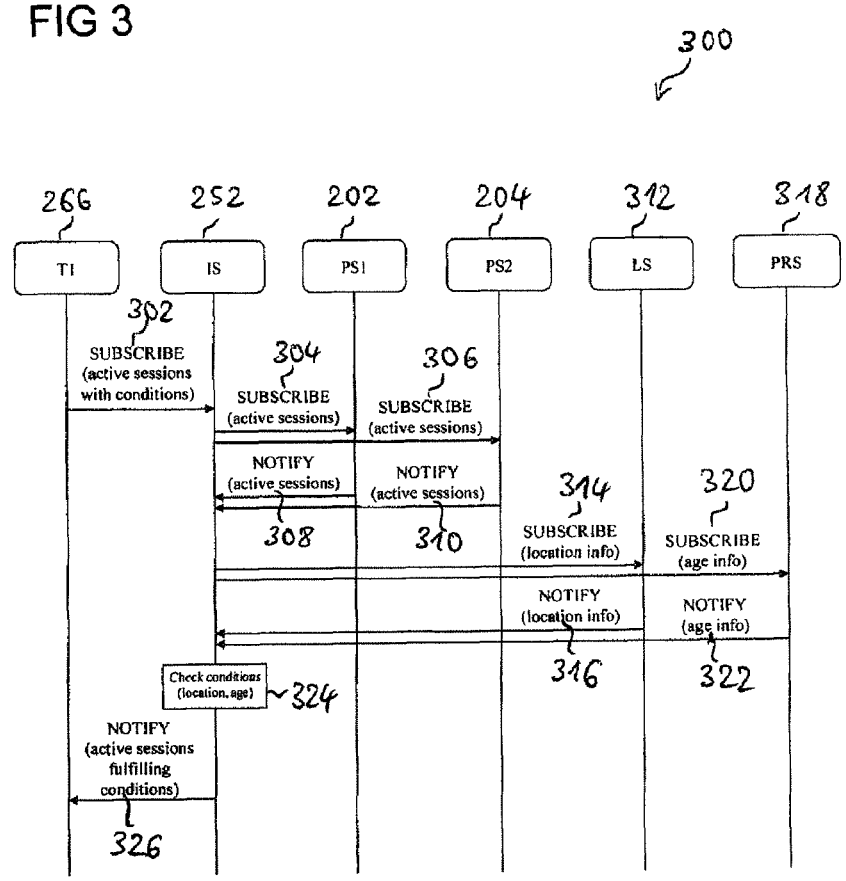

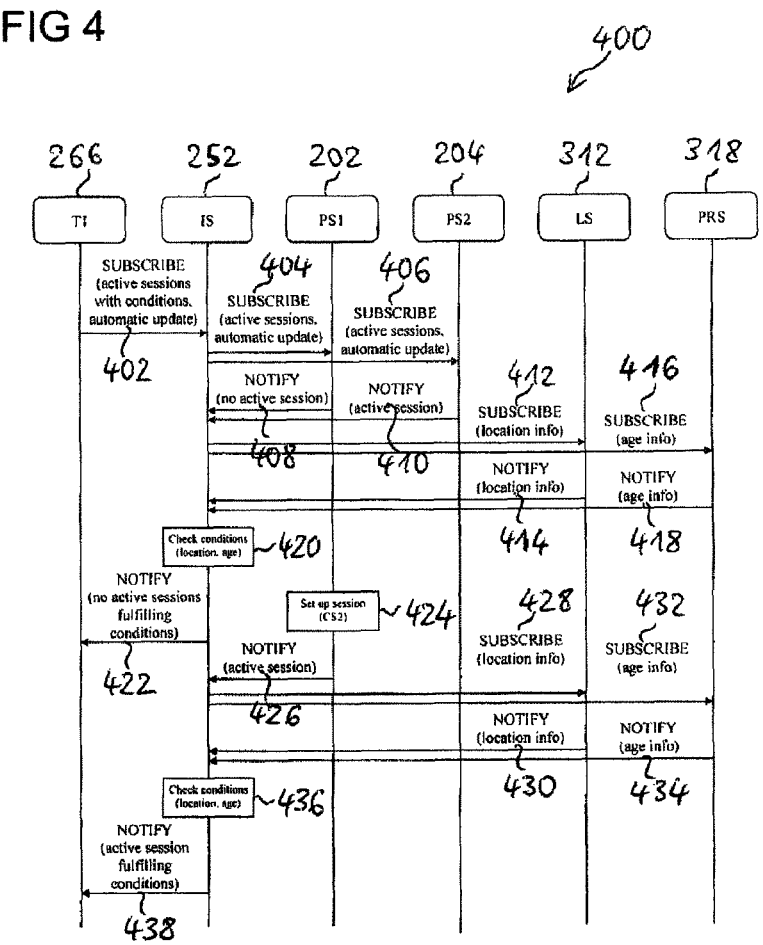

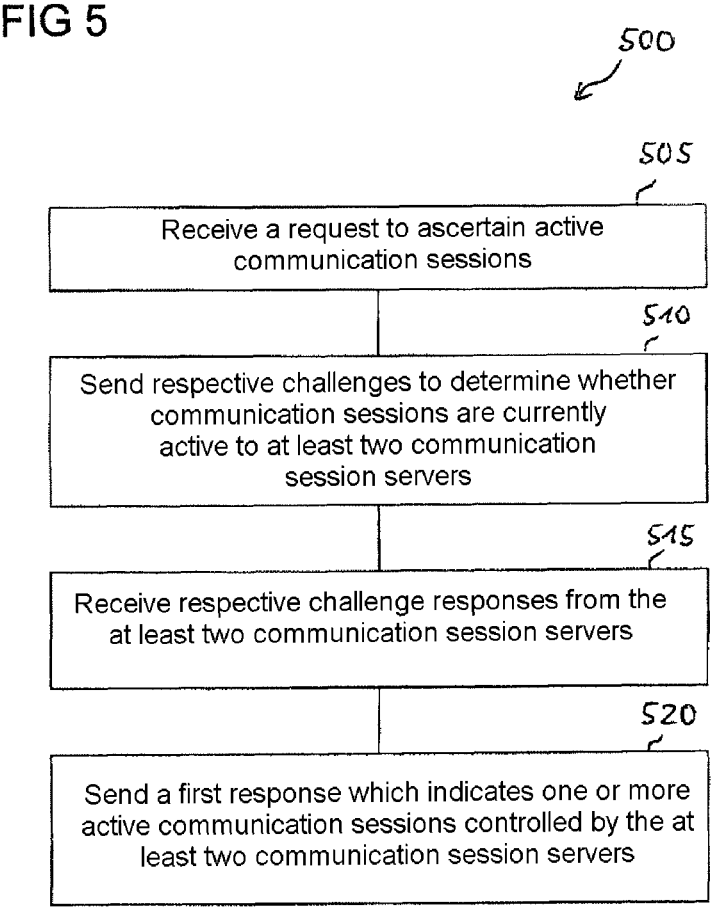

METHOD FOR DETERMINING ACTIVE COMMUNICATION SESSIONS AND COMMUNICATION SESSION INFORMATION SERVER

RELATED APPLICATIONS

The present application is a national stage entry according to 35 U.S.C. §371 of PCT application No.: PCT/EP2009/056974 filed on Jun. 5, 2009, which claims priority from German application No.: 10 2008 029 142.0 filed on Jun. 19, 2008.

TECHNICAL FIELD

Various embodiments relate to a method for ascertaining active communication sessions and to a communication session information server.

BACKGROUND

Communication with technical means between a finite number of particular participants is referred to as a communication session. In a communication system, the right to communicate (communication right) is usually controlled by means of a communication right allocation mechanism. As part of this mechanism, the participant in a communication session requests a communication right from a communication session server, and the server approves the right or does not approve it.

By way of example, conference systems allow communication appliances to be used for communication between a plurality of users.

In order to allow ordered communication, usually not all the participants in a conference receive the right to communicate via a particular medium (such as audio, video, text, etc.) at the same time. On the contrary, the communication rights are usually allocated on the basis of certain prescribed rules.

In a large conference room, a conference system is used which provides the participants with a plurality of microphones and loudspeakers for voice communication for example. The microphones need to be switched on by the respective speaker in order to use them. A microphone which has been switched on blocks all other microphones, so that only one speaker can ever be active. By way of exception, it is also possible for a further microphone (for example the microphone of the chair of the conference) to be active at the same time. The right to speak is thus only ever given to one participant and possibly to the chair of the conference.

A comparable service also exists for mobile radio telephones: Push-to-Talk (PTT). The technical term Push-to-Talk denotes that the speaker usually operates a special key on the mobile radio telephone in order to send messages, as in the case of a "walkie-talkie" (a small radio telephone set). The transmission of messages from other users of this service is blocked during this time. Examples of PTT services are "Direct Connect" from Nextel in the USA and "Push-to-Talk over Cellular" (PoC) from the Open Mobile Alliance (OMA).

In a Push-to-Talk conference system, communication rights are requested and allocated by means of what is known as the "RealTime Control Protocol" (RTCP), for example.

In a conference system as proposed by the IETF (Internet Engineering Task Force) committee, an example of an Internet-based conference system, and in a Push-to-Talk conference system (also called a PTT conference system) today, communication sessions are controlled using what is known as the "Session Initiation Protocol" (SIP), for example.

Conference systems based on the IETF and PTT conference systems usually have a centralized architecture. This means that the participants in such conference systems do not communicate with one another directly but rather communicate with one another via a central communication session server (also called a telecommunication server or telecommunication conference server). The central communication session server is arranged in the non-mobile part of the telecommunication network in the case of a mobile communication system or conference system, as explained in more detail below.

A communication session in a communication system may be active or not active. A communication session is active if the communication system simply provides the necessary means for communication. If the means are not available (for example because the necessary communication channels for transmitting data have not yet been prepared), the communication session is not active.

A communication session in a communication system or conference system is initiated by initiating the setup of the necessary communication means. By way of example, the initiation can be performed by one of the communication session participants by virtue of it instructing a central communication session server to provide the communication means. In this case, the participant notifies the server of which participants are intended to be able to communicate with one another.

The participants in the communication session can be specified by a list of participant addresses or by an address which refers to a list of participant addresses (group address).

What is known as a predefined PTT group is specified in a group server by an address which refers to a list of participant addresses. What is known as a chat group is likewise specified in a group server by an address which refers to a list of participant addresses. In contrast to a predefined PTT group, the members of a chat group are not all invited to initiate a chat communication session at once. On the contrary, the participants in a chat group can join a chat communication session by dialing up separately. What is known as an adhoc group is specified by a list of participant addresses. The addresses are specified with the invitation to join an adhoc communication session by the inviter.

A drawback is that a potential participant in communication sessions has no information about ongoing, that is to say, active, communication sessions. He must first of all use his communication session participant appliance to dial up into a communication session or to invite himself to a communication session in order to be able to establish whether other participants are participating or ready to participate in this communication session. If a potential user is interested in a plurality of communication sessions, it is complex and time-consuming for him to find out which communication sessions are currently active. Therefore, he possibly misses a communication session of interest or a part of it.

SUMMARY

It would be desirable to be able to obtain information about active communication sessions more easily and more quickly.

In line with various exemplary embodiments of the invention, a request prompts active communication sessions to be automatically ascertained and reported back, with optionally only those communication sessions which fulfill further prescribable conditions being reported back.

A method for ascertaining active communication sessions involves a request to ascertain active communication sessions being received by a communication session information server. Respective challenges to determine whether communication sessions are currently active are transmitted from the communication session information server to at least two communication session servers. Respective challenge responses from the at least two communication session servers, which indicate one or more active communication sessions controlled by the respective communication session server or indicate that such communication sessions currently do not exist, are received by the communication session information server. A first response, which indicates one or more active communication sessions controlled by the at least two communication session servers or indicates that such communication sessions currently do not exist, is transmitted by the communication session information server.

A communication session information server has a request acceptance unit which is set up to receive a request to ascertain active communication sessions. It has a challenge unit which is set up to send respective challenges to determine whether communication sessions are currently active to at least two communication session servers and which is set up to receive respective challenge responses from the at least two communication session servers which indicate one or more active communication sessions controlled by the respective communication session server or indicate that such communication sessions currently do not exist. In addition it has a response unit which is set up to send a first response which indicates one or more active communication sessions controlled by the at least two communication session servers or indicates that such communication sessions currently do not exist.

A communication session information server, subsequently also called an information server, is a server which can ascertain information about communication sessions and can send it to a challenging station. A server is a technical unit which provides or controls a service, for example, a communication service. A server may contain both hardware, e.g. electric circuits, processors, storage media, etc., and software, e.g. operating systems and control programs. A communication session is communication using technical means between a finite number of particular participants. A communication session server is a server which provides or controls communication sessions, for example controls the connection setup and the allocation of communication rights for communication sessions in a communication system. A communication session information server and a communication session server can also be implemented as respective functions of the same server.

One aspect of the invention can clearly be seen in that active communication sessions are ascertained by an information server which is set up for this purpose. A user of the activity information requests the active communication sessions from the information server. The information server then requests from the individual session servers the active sessions which are controlled by them and forwards the collected active sessions to the challenging user.

This gives rise to the advantage that it becomes possible to check active communication sessions which are controlled by different servers. In particular, this allows active communication sessions to be checked which are controlled in different networks (for example provided by different network operators). A further advantage arises from the fact that the active sessions of a plurality of communication session servers are collected by the information server and are sent to the challenging user in a single message. This saves signaling complexity.

Further exemplary embodiments of the invention can be found in the dependent patent claims and in the description which follows. In this case, where applicable, the explanations relating to the methods also apply mutatis mutandis to the apparatuses, and vice versa.

In line with one exemplary embodiment of the invention, the received request is a request from a communication session participant appliance and the first response is sent to the communication session participant appliance.

Expressed in clear terms, a challenging user may be the user of a communication terminal or participant appliance, expressed in more general terms an appliance which a participant can use to participate in a communication session (communication session participant appliance), for example. In this case, the received request comes from the appliance of the user. The received request can also come from another communication appliance, for example from a server in a communication network, and the first response can be returned to the communication appliance, for example, the server in a communication network. In this case, the communication appliance, for example, the server, can itself be regarded as a user.

In line with another exemplary embodiment of the invention, the received request may contain one or more conditions for active communication sessions which are to be ascertained. The first response may be in a form such that it indicates only such active communication sessions as fulfill the one or more conditions or indicates that such communication sessions currently do not exist.

One aspect of the exemplary embodiment can be seen clearly in that the challenging user uses his challenge to define conditions for the active communication sessions which are to be reported back. The information server then checks the conditions and reports back only such active sessions as meet the conditions, i.e. fulfill them. This has the advantage that appropriate definition of conditions which are placed on the active sessions which are to be reported back achieves a situation in which only such sessions as are of interest to the challenging user are reported back.

The one or more conditions may relate to a presence information item and/or a location information item.

In line with a further exemplary embodiment of the invention, the communication session information server checks whether the one or more active communication sessions controlled by the respective communication session server which are indicated in the respective challenge responses from the at least two communication session servers fulfill the one or more conditions.

Provision may be made for a second response to be transmitted by the communication session information server, which response indicates one or more active communication sessions, controlled by the at least two communication session servers, which were not indicated in the first response. As a result, it is possible to send active communication sessions found to a challenging user in a plurality of notification messages. This has the advantage that communication sessions found first can be communicated more quickly.

In line with one exemplary embodiment of the invention, the communication sessions indicated in the second response which were not indicated in the first response contain one or more communication sessions which were not active and/or did not fulfill the one or more conditions at the time of the transmission of the first response. This has the advantage that the receiver of the second response can be automatically informed about activity changes from communication sessions for the purpose of activity recording.

In line with a further exemplary embodiment of the invention, the communication session information server transmits a third response which indicates that one or more of the active communication sessions indicated in the first and/or second response are no longer active and/or no longer fulfill the one or more conditions at the time of the transmission of the third response. This has the advantage that the receiver of the third response can be automatically informed about activity changes from communication sessions for the purpose of activity adjustment.

In line with one exemplary embodiment of the invention, the concept that a communication session is indicated may involve a group address for the communication session being specified and/or participant addresses for the communication session being specified. This has the advantage that it can be used to explicitly identify the communication session or the participant group in the communication session. It is possible for a communication session to be indicated by the participant addresses of all the participants associated with the communication session. It is also possible for the participant addresses of the participants which are currently actively participating in the communication session to be marked, or for only the participant addresses of the participants which are currently actively participating in the communication session to be indicated. This has the advantage that a piece of information is provided about which of the potential participants in a communication session are actually currently actively participating in the communication session.

The request, the first response, the second response or the third response can each be transmitted by means of a message in line with a communication control protocol, wherein the communication control protocol may be one of the following protocols (but is not limited to these examples): Session Initiation Protocol SIP, RealTime Control Protocol RTCP, HyperText Transport Protocol http, File Transfer Protocol FTP, Simple Mail Transfer Protocol SMTP. If a message based on SIP is used for transmission, messages of the "SIP SUBSCRIBE" or "SIP MESSAGE" type or an SIP message redefined specifically for this purpose may be used.

In line with another exemplary embodiment of the invention, provision may be made, instead of inter-change of messages in line with a protocol, for the communication session information server to be used to store a challenge with conditions. The information server then provides a document, for example an XML document, i.e. a document in a format based on the Extensible Markup Language (XML), which contains all the active sessions with the stored properties. The information server updates the document when active sessions fulfilling the conditions are started or ended. In order to find active sessions which fulfill the conditions, the challenging communication appliance reads this document, for example by means of XCAP (XML Configuration Access Protocol) or Xpath (XML path language).

Provision may also be made for the document provided by the information server to be used to store all active sessions together with their properties. In this case, the terminal of a challenging user can read the document and ascertain active sessions therefrom itself which fulfill the particular conditions.

Instead of notifying a user about changes in active communication sessions as soon as sessions are changed, provision may be made for the altered sessions to be stored in a list in the terminal of the user. The list then can be viewed by the user at another time.

The communication sessions based on exemplary embodiments of the invention may be communication sessions in which communication is effected by means of realtime media streams. It is possible for the communication sessions to be telecommunication conference sessions. The telecommunication conference sessions may be Push-to-Talk over Cellular telecommunication conference sessions.

BRIEF DESCRIPTION OF THE DRAWINGS

Exemplary embodiments of the invention are illustrated in the figures and are explained in more detail below.

In the figures,

FIG. 3 shows a message flowchart showing the message flow for ascertaining active communication sessions based on an exemplary embodiment of the invention;

FIG. 4 shows a message flowchart showing the message flow for ascertaining active communication sessions based on another exemplary embodiment of the invention; and FIG. 5 shows a flowchart showing a method based on a further exemplary embodiment of the invention.

DETAILED DESCRIPTION

The following detailed description refers to the accompanying drawings that show, by way of illustration, specific details and embodiments in which the invention may be practiced.

Within the context of this description, the terms "connected" and "coupled" are used to describe both direct and indirect connection and also direct or indirect coupling. In the figures, identical or similar elements are provided with identical reference symbols where expedient.

Figure 1:
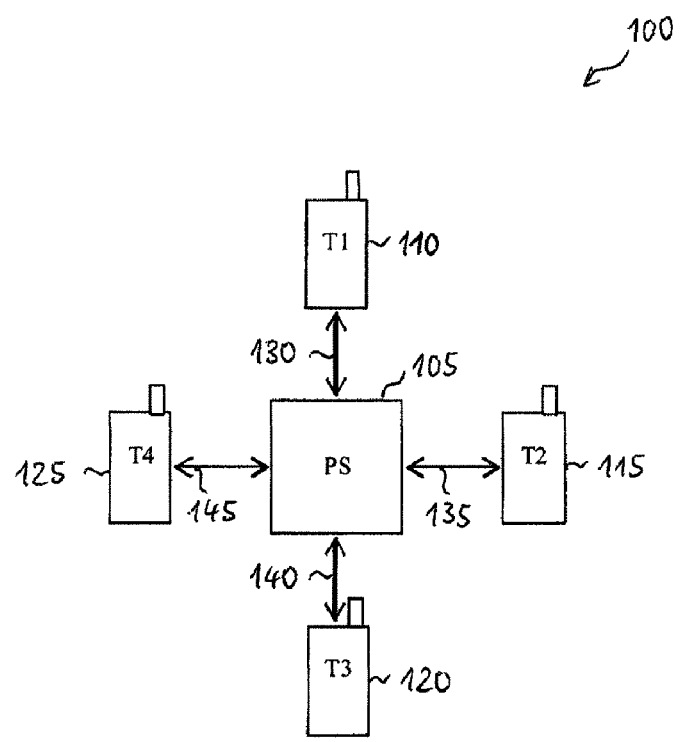
FIG. 1 shows a block diagram of a telecommunication conference system based on an exemplary embodiment of the invention.

FIG. 1 shows a simplified illustration of a telecommunication conference system 100 based on an exemplary embodiment of the invention.

The telecommunication conference system 100 is designed on the basis of Push-to-Talk over Cellular (PoC) in line with the Open Mobile Alliance (OMA) standard, with the individual components additionally being set up such that they can perform the methods and communication protocols described below. The fundamental architecture of the telecommunication conference system 100 described in FIG. 1 applies to all the exemplary embodiments described below.

The telecommunication conference system 100 has a central PoC server PS 105 (PTT server) as conference server, and also a plurality of mobile radio communication terminals, for example mobile radio telephones 110, 115, 120, 125, wherein the mobile radio communication terminals 110, 115, 120, 125 each contain a PoC client unit which is set up for communication in line with the communication standard for Push-to-Talk over Cellular. The mobile radio communication terminals 110, 115, 120, 125 are coupled to the PTT server 105 via a respective air interface by means of a respective radio communication link 130, 135, 140, 145. Hence, the participants T1, T2, T3, T4, and hence the users of the mobile radio communication terminals 110, 115, 120, 125, communicate with one another not directly but rather by means of the central PTT server 105.

The PTT server 105 is an example of a communication session server. The mobile radio communication terminals 110, 115, 120, 125 are respective examples of communication session participant appliances.

In line with this exemplary embodiment of the invention, four participants T1, T2, T3, T4, and hence four mobile radio communication terminals 110, 115, 120, 125, are shown by way of simplification, even though an arbitrary number of participants and mobile radio communication terminals may be provided. The participants T1, T2, T3, T4 communicate using audio, that is to say by means of speech, with the respective participant in each case being exclusively assigned a communication right, in line with this exemplary embodiment of the invention a right to talk, by the PTT server 105 on the basis of the half-duplex method.

The assignment of the right to talk, generally of the communication right, and hence the control of communication rights are effected by the PTT server 105 using messages based on the RealTime Control Protocol (RTCP) communication protocol.

Requested communication rights are stored in a queue which is implemented in a memory of the PTT server 105. When a communication right is assigned, each participant is assigned a time slot in which he can transmit voice data to the other participants in the telecommunication conference without being able to be interrupted by the other participants. During this time, the other participants cannot introduce data into the telecommunication conference, that is to say that they are not provided with a communication right.

In alternative exemplary embodiments of the invention, the telecommunication conference system 100 may be set up in line with the IETF conferencing framework, a proposal by the "Internet Engineering Task Force" (IETF) committee.

In addition, the mobile radio communication terminals 110, 115, 120, 125 may be set up as cordless communication terminals or else as wired communication terminals. The communication terminals may be integrated in a computer, for example, in a personal computer, in a work station, in a personal digital assistant (PDA), a laptop, a notebook, generally any system provided with a processor which is suitable for participation in a telecommunication conference or communication session.

Figure 2:
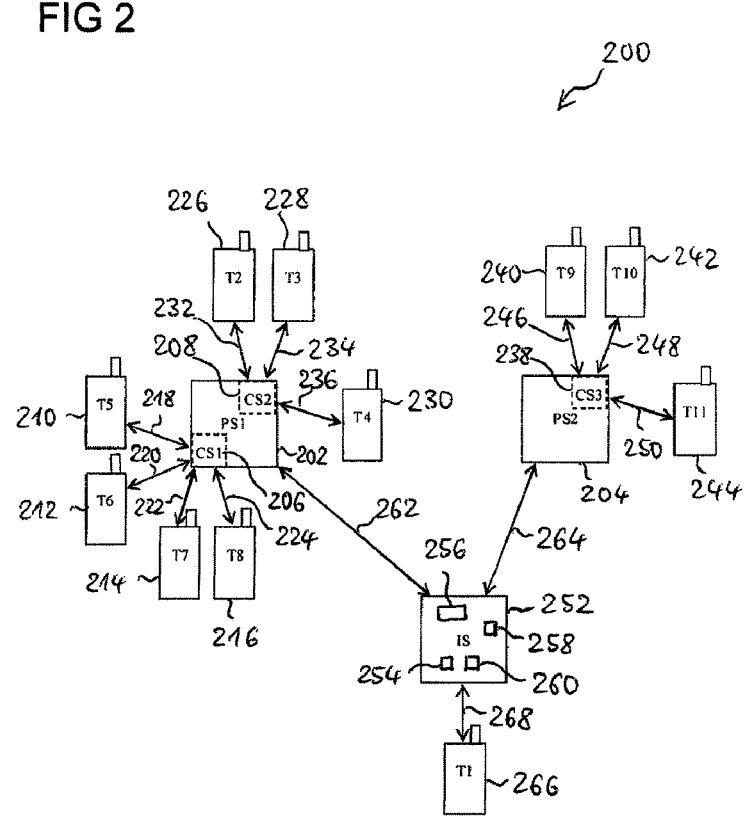
FIG. 2 shows an extended illustration of a block diagram of a telecommunication conference system based on an exemplary embodiment of the invention.

FIG. 2 shows an extended illustration of a block diagram of a telecommunication conference system 200 based on an exemplary embodiment of the invention.

The telecommunication conference system 200, which is likewise set up in line with a PTT standard, for example in line with PoC, as described above in FIG. 1, has a first PTT server PS1 202 and a second PTT server PS2 204 in this example.

In the example shown in FIG. 2, it is assumed that the PTT server 202 controls the two communication sessions CS1 206 and CS2 208. The communication session CS1 206 is a communication session in a predefined (prearranged) PTT group, the participants in which can communicate with one another by means of the mobile radio telephones 210, 212, 214, 216, which are coupled to the PTT server PS1 202 by means of respective mobile radio links 218, 220, 222, 224. The communication session CS2 208 is assumed to be a chat group. The participants in the chat group can use their mobile radio telephones 226, 228, 230, which are coupled to the PTT server PS1 202 by means of respective mobile radio links 232, 234, 236, to communicate with one another.

In addition, it is assumed that the PTT server PS2 204 controls the communication session CS3 238. The communication session CS3 238 is an adhoc session, the participants in which can use their respective mobile radio telephones 240, 242, 244, which are coupled to the PTT server PS2 204 via respective mobile radio links 246, 248, 250, to communicate with one another.

The communication sessions CS1 206, CS2 208, CS3 238 may in each case be active or not active at a particular time. A communication session is active when the communication system currently provides the necessary means for communication. If the means are not available (for example, because the necessary communication channels for transmitting data are not yet prepared), the communication session is not active.

In addition, a communication session information server IS 252 is provided. The communication session information server IS 252 has a request acceptance unit 254, a challenge unit 256, a condition checking unit 258 and a response unit 260.

The communication session information server 252 is coupled to the PTT server PS1 202 and the PTT server PS2 204 by communication links 262 and 264, for example, for radio communication or for wired communication, which are suitable for the data communication between servers.

A mobile radio telephone 266 associated with a challenging user T1 is coupled to the communication session information server 252 by means of the radio communication link 268 directly or indirectly (by way of example indirectly means with the interposition of forwarding entities, for example mobile radio network units and possibly, further communication channels, including wired ones).

The mobile radio telephone 266 is an example of a communication session participant appliance. The PTT servers PS1 202 and PS2 204 are examples of communication session servers.

FIG. 3 shows a message flowchart showing the message flow for ascertaining active communication sessions based on an exemplary embodiment of the invention. In this case, the illustration of the message flow is based on the architecture of the telecommunication conference system 200 shown in FIG. 2.

In this exemplary embodiment, it is assumed that the communication sessions CS1 206, CS2 208, CS3 238 are currently all active.

A user of PTT services wishes to use the mobile radio telephone 266 to participate in a PTT session. He wishes to communicate with other participants who belong to his age group (say between 20 and 30 years old) and who are currently residing in the same city as him (say Munich).

The user of the mobile radio telephone 266 uses it to activate the function of ascertaining active communication sessions. The mobile radio telephone 266 sends a challenging message to the communication session information server 252. The challenging message contains the conditions "city of Munich" and "between 20 and 30 years old".

The challenge is sent by means of Session Initiation Protocol (SIP) in the form of an SIP-SUBSCRIBE message 302. The text added to the message type SUBSCRIBE in FIG. 3 for the illustration of the message 302 symbolizes the fundamental content of the message. A challenge is sent for "active sessions" and "with conditions".

The following pseudo code illustration gives a more detailed description of the general structure of the SIP-SUBSCRIBE message 302 based on an exemplary embodiment of the invention:

SUBSCRIBE sip:6172531000@mit.edu SIP/2.0
From: <sip:6172531000@mit.edu>;tag=11005c11005
To: <sip:6172531000@mit.edu>;tag=765268780
Call-Id: 9c0a1ef37f461a8feb7b80fe84855a4f
Cseq: 1451 SUBSCRIBE -continued

```
Contact: sip:6172531000@ 18.10.0.79
Event: active-session
Accept: application/active-session-summary
Expires: 0
Date: Wed, 05 Jan 2005 02:57:34 GMT
Accept-Language: en
Supported: sip-cc, sip-cc-01, timer, replaces
User-Agent: Pingtel/2.1.11 (VxWorks)
Content-Length: 30
Location="Munich"
Age="20-30"
```

In the pseudo code, "event: active-session" indicates that information about active communication sessions is being requested. "Expires: 0" indicates that active sessions are intended to be communicated only once. The text in the message body 'Location="Munich" Age="20-30"' defines conditions for the active communication sessions which are to be returned.

The SIP-SUBSCRIBE message 302 is received by the communication session information server IS 252, to be more precise by the request acceptance unit 254. This is an example of the reception of a request to ascertain active communication sessions via a communication session information server. This is also an example of the received request containing one or more conditions for active communication sessions which are to be ascertained.

The communication session information server IS 252 then transfers respective challenges to determine whether communication sessions are currently active to the PTT servers PS1 202 and PS2 204 as SIP-SUBSCRIBE messages 304, 306 using its challenge unit 256. The messages 304, 306 each contain a reference to "active sessions", but no further condition information.

The PTT servers PS1 202 and PS2 204 respond to the communication session information server IS 252 with SIP-NOTIFY messages. FIG. 3 shows these as messages 308, 310 in each case with the type NOTIFY and the content reference "active sessions". The notification message 308 from the PTT server PS1 202 contains identifiers for the communication sessions CS1 206 and CS2 208 and the addresses of the participants in these communication sessions. The notification message 310 of the PTT server PS2 contains an identifier for the communication session CS3 238 and the addresses of the participants in the communication session CS3. The identifier of the communication session CS1 206 is the address of the predefined PTT group. The identifier of the communication session CS2 208 is the address of the chat group. The identifier of the communication session CS3 238 is an address temporarily allocated by the PTT server PS2 204.

The messages 308, 310 are received by the communication session information server IS 252, to be more precise by its challenge unit 256. This is an example of the reception of respective challenge responses from the at least two communication session servers which indicate one or more active communication sessions controlled by the respective communication session server.

When the communication session information server IS 252 has received the notification messages from the PTT servers PS1 202 and PS2 204, it requests from a location server LS 312 the geographical location of the participants in the communication sessions CS1 206, CS2 208, CS3 238. This is done using the SIP-SUBSCRIBE message 314, which in the illustration in FIG. 3 contains "location info" as a content reference. The location server LS 312 returns the requested information to the communication session information server IS 252 using the SIP-NOTIFY message 316.

Furthermore, the communication session information server IS 252 requests from a presence server PRS 318 the age of the participants in the communication sessions CS1 206, CS2 208, CS3 238. This is done using the SIP-SUBSCRIBE message 320, which in the illustration in FIG. 3 contains the content reference "age info". The presence server 318 responds with the SIP-NOTIFY message 322, which transmits the desired information to the communication session information server IS 252.

The communication session information server IS 252 then uses its condition checking unit 258 to check the conditions contained in the message 302, i.e. the original challenge using the location information and age information. This is symbolized in FIG. 3 by the event field 324, which relates to "check conditions" and "location, age".

This is an example of checking whether the one or more active communication sessions which are controlled by the respective communication session server and which are indicated in the respective challenge responses from the at least two communication session servers fulfill the one or more conditions.

The communication session information server IS 252 finds not only the communication session CS2 208 fulfills the imposed conditions. Therefore, the communication session information server IS 252 sends a notification message to the mobile radio telephone 266 which contains the identifier of the communication session CS2 208. The notification message is sent as an SIP-NOTIFY message 326 by the response unit 260 of the information server IS 252. The additional label "active sessions fulfilling conditions" of the message 326 in FIG. 3 symbolizes that the message indicates active sessions which fulfill the conditions transmitted with the message 302.

This is an example of sending a first response which indicates one or more active communication sessions controlled by the at least two communication session servers.

The pseudo code illustration below provides a more detailed description of the general structure of the SIP-NOTIFY message 326 based on an exemplary embodiment of the invention:

```
NOTIFY sip:6172531000@18.142.4.231 SIP/2.0
Content-type: application/simple-message-summary
Content-Length: 113
Event: active-session
From: <sip:6172531000@mit.edu>;tag=11005c11005
To: <sip:6172531000@mit.edu>;tag=765268780
Call-Id: 9c0a1ef37f461a8feb7b80fe84855a4f
Cseq: 2944 NOTIFY
Contact: sip:18.7.21.118:5110
Date: Wed, 05 Jan 2005 02:57:35 GMT
Max-Forwards: 20
User-Agent: Pingtel/2.2.0 (Linux)
Accept-Language: en
Supported: sip-cc-01, timer
Session-ID=<sip:7656354@mit.edu>
Participants=<sip:567485433@mit.edu>;<sip:887592@mit.edu>;sip:528857@mit.edu>
```

In the pseudo code, the text of the message body is used to communicate the addresses of the communication session and also of the individual participants as "session-ID" (session identifier) and "participants".

FIG. 4 shows a message flowchart 400 showing the message flow for ascertaining active communication sessions in line with another exemplary embodiment of the invention. In this exemplary embodiment, the architecture of the telecommunication conference system 200 which is shown in FIG. 2 is likewise taken as a basis. English labels which are shown for messages in FIG. 4 which have already been used for messages in FIG. 3 have the same meaning as indicated in the description for FIG. 3.

For the exemplary embodiment shown in FIG. 4, it is assumed that the two communication sessions controlled by the PTT server PS1 202 are currently not active. At first, only the communication session CS3 238, which is controlled by the PTT server PS2 204, is assumed to be active.

A user of the mobile radio telephone 266 wishes to participate in a PTT session. He is interested in communicating with participants who are from his age group (between 20 and 30 years old) and who are currently residing in his city (Munich). The user uses his mobile radio telephone 266 to activate the function for ascertaining active communication sessions. The mobile radio telephone 266 sends a request to ascertain active communication sessions to the communication session information server IS 252 in the form of the SIP-SUBSCRIBE message 402. The request contains the conditions "city of Munich" and "between 20 and 30 years old". The term "automatic update" illustrated in chart 400 for the message 402 symbolizes that the message 402 also contains an information element which communicates that the mobile radio telephone 266 is intended to be automatically informed about new active PTT sessions.

The pseudo code illustration below describes the general structure of the SIP-SUBSCRIBE message 402 based on an exemplary embodiment of the invention:

```
SUBSCRIBE sip:6172531000@mit.edu SIP/2.0
From: <sip:6172531000@mit.edu>;tag=11005c11005
To: <sip:6172531000@mit.edu>;tag=765268780
Call-Id: 9c0a1ef37f461a8feb7b80fe84855a4f
Cseq: 1451 SUBSCRIBE
Contact: sip:6172531000@ 18.10.0.79
Event: active-session
Accept: application/active-session-summary
Expires: 3600
Date: Wed, 05 Jan 2005 02:57:34 GMT
Accept-Language: en
Supported: sip-cc, sip-cc-01, timer, replaces
User-Agent: Pingtel/2.1.11 (VxWorks)
Content length: 30
Location="Munich"
Age="20-30"
```

In the pseudo code illustration, the term "event: active-session" indicates that information about active communication sessions is being requested. The term "expired: 3600" indicates that updates within the next 3600 seconds, that is to say within the next hour, need to be communicated automatically. The text in the message body "location=Munich age=20-30" defines conditions for the active communication sessions which are to be returned.

The information server IS 252, to be more precise its challenge unit 256, then transfers respective challenges to determine whether communication sessions are currently active to the PTT servers PS1 202 and PS2 204 in the form of the SIP-SUBSCRIBE messages 404, 406. The messages 404, 406 do not contain any condition information. The respective label "automatic update" in the messages 404, 406 in chart 400 symbolizes that these two messages each contain an information element which communicates that the communication session server IS 252 is intended to be automatically informed about new active PTT sessions which are controlled by the PTT servers 202, 204.

The PTT servers 202, 204 respond to the communication session information server IS 252 in each case with notification messages in the form of SIP NOTIFY messages. Since the PTT server PS1 202 currently does not control any active communication sessions, its notification message 408 does not contain any identifiers of communication sessions. The demonstration of the message 408 in chart 400 with the term "no active session" symbolizes that the message 408 indicates that active communication sessions which are controlled by the PTT server PS1 202 currently do not exist. The notification message 410 from the PTT server PS2 204 contains an identifier for the communication session CS3 238 and the addresses of the participants in this communication session.

The messages 408, 410 are received by the communication session information server IS 252. The reception of the message 408 is an example of receiving a challenge response from a communication session server which indicates that active communication sessions controlled by the communication session server currently do not exist.

The communication session information server IS 252 then requests, in a similar manner to that described in the exemplary embodiment in FIG. 3, the geographical location of the participants in the communication session CS3 238 from the location server LS 312 using the message 412. The location server 312 responds with the notification message 414, which is received by the communication session information server IS 252. Similarly, the communication session information server IS 252 uses the message 416 to request from the presence server PRS 318 the age of the participants in the communication session CS3 238. The presence server PRS 318 responds with the notification message 418, which is received by the communication session information server IS 252.

The communication session information server IS 252 then uses its condition checking unit 258 to check, on the basis of the location information and age information obtained, whether the conditions contained in the message 402 are fulfilled, which is illustrated by the event field 420 in a similar manner to FIG. 3. In this exemplary embodiment the communication session information server 252 establishes that the communication session CS3 238 does not fulfill the conditions. Therefore, it sends the notification message 422, which does not contain any identifier for a communication session, to the mobile radio telephone 266. The term illustrated for the message 422 "no active sessions fulfilling conditions" illustrates that no active communication sessions fulfilling conditions are being communicated.

This is an example of the first response indicating that such communication sessions as fulfill the one or more conditions currently do not exist.

As time passes, the communication session CS2 208 is now assumed to be initiated and then controlled by the PTT server PS1 202, as symbolized by the event field 424 with the label "set up session". The communication session CS2 208 has therefore changed its status from "not active" to "active". When the communication session has been set up the PTT server PS1 202 sends the notification message 426, illustrated in FIG. 4, with the label "active session", to the communication session information server IS 252, which notification message communicates that the communication session CS2 208 is now active. The message 426 also contains an identifier for the communication session CS2 208 and the addresses of the participants in this communication session.

The communication session information server IS 252 then uses the message 428 to request from the location server LS 312 the geographical location of the participants in the communication session CS2 208 and receives the location information by means of the message 430. In addition, the communication session information server IS 252 requests from the presence server PRS 318 the age of the participants in the communication session CS2 208 and receives the age information by means of the message 434.

Next, the communication session information server IS 252 checks the location information and age information received with the messages 430, 434 to determine whether the conditions contained in the message 402 are fulfilled. This is symbolized in chart 400 by the event field 436. The communication session information server IS 252 establishes that the communication session CS2 208 does fulfill the conditions. Therefore, the communication session information server IS 252 uses its response unit 260 to send the notification message 438, which contains the identifier of the communication session CS2 208, to the mobile radio telephone 266. By way of example, the mobile radio telephone 266 can then output a piece of information about the new active communication session to the user and invite the user to participate in the session.

The sending of the message 438 by the communication session information server IS 252 is an example of sending a second response which indicates one or more active communication sessions which are controlled by the at least two communication session servers and which were not indicated in the first message, these communication sessions containing one or more communication sessions which were not active and/or did not fulfill the one or more conditions at the time at which the first response was sent.

FIG. 5 shows a flowchart 500 showing a method for ascertaining active communication sessions based on an exemplary embodiment of the invention. The exemplary embodiment shown in FIG. 5 can be combined with all other exemplary embodiments which have been described.

In 505 a request to ascertain active communication sessions is received by a communication session information server.

Optionally, the received request may contain one or more conditions for active communication sessions which are to be ascertained.

In 510, respective challenges to determine whether the communication sessions are currently active are sent from the communication session information servers to at least two communication servers.

In 515, respective challenge responses from the at least two communication session servers which indicate one or more active communication sessions controlled by the respective communication session server or indicate that such communication sessions currently do not exist are received by the communication session information server.

Optionally, the communication session information server can check whether the one or more active communication sessions controlled by the respective communication session server and indicated in the respective challenge responses from the at least two communication session servers fulfill the one or more conditions. Optionally, one or more further challenges for a piece of information which is relevant to the one or more conditions for active communication sessions which are to be ascertained can be sent. Optionally, one or more further challenge responses with such information can be received by the communication session information server. Optionally, evaluation of a received piece of information which is relevant to the one or more conditions for active communication sessions which are to be ascertained can be used to check whether the one or more conditions for active communication sessions which are to be ascertained are fulfilled.

In 520 a first response which indicates one or more active communication sessions controlled by the at least two communication session servers or indicates that such communication sessions currently do not exist is sent by the communication session information server.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for ascertaining active communication sessions, the method comprising:
   receiving a request to ascertain active communication sessions by a communication session information server;
   transmitting respective challenges to determine whether communication sessions are currently active from the communication session information server to at least two communication session servers;
   receiving respective challenge responses from the at least two communication session servers, which indicate one or more active communication sessions controlled by the respective communication session server or indicate that such communication sessions currently do not exist, by the communication session information server;
   transmitting a first response, which indicates one or more active communication sessions controlled by the respective at least two communication session servers or indicates that such communication sessions currently do not exist, by the communication session information server; and
   transmitting a second response, which indicates one or more active communication sessions, controlled by the at least two communication session servers, which were not indicated in the first response, by the communication session information server;
   wherein the communication sessions indicated in the second response which were not indicated in the first response contain one or more communication sessions which were not active and/or did not fulfill the one or more conditions at the time of the transmissions of the first response.

2. The method as claimed in claim 1, wherein the received request is a request from a communication session participant appliance and the first response is sent to the communication session participant appliance.

3. The method as claimed in claim 1, wherein the received request contains one or more conditions for active communication sessions which are to be ascertained and the first response indicates only such active communication sessions as fulfill the one or more conditions or indicates that such communication sessions currently do not exist.

4. The method as claimed in claim 3, wherein the one or more conditions relate to at least one of a presence information item and a location information item.

5. The method as claimed in claim 3, further comprising:
   checking by the communication session information server to determine whether the one or more active communication sessions controlled by the respective communication session server which are indicated in the respective challenge responses from the at least two communication session servers fulfill the one or more conditions.

6. The method as claimed in claim 1, further comprising:
transmitting a third response, which indicates that one or more of the active communication sessions indicated in at least one of the first and second response are no longer active and/or no longer fulfill the one or more conditions at the time of the transmission of the third response, by the communication session information server.

7. The method as claimed in claim 1, wherein indicating a communication session comprises a group address for the communication session being specified and/or participant addresses for the communication session being specified.

8. The method as claimed in claim 1, wherein at least one article from the group comprising:
request,
first response,
second response,
third response,
is transmitted by means of a message in line with a communication control protocol.

9. The method as claimed in claim 8, wherein the communication control protocol is one of the following:
Session Initiation Protocol SIP,
RealTime Control Protocol RTCP,
HyperText Transport Protocol http,
File Transfer Protocol FTP,
Simple Mail Transfer Protocol SMTP.

10. The method as claimed in claim 1, wherein the communication sessions are those in which communication is effected by means of realtime media streams.

11. The method as claimed in claim 1, wherein the communication sessions are telecommunication conference sessions.

12. The method as claimed in claim 11, wherein the telecommunication conference sessions are Push-to-Talk over Cellular telecommunication conference sessions.

13. A communication session information server, comprising:
a processor coupled to a memory to execute:
a request acceptance unit which is configured to receive a request to ascertain active communication sessions;
a challenge unit which is configured to send respective challenges to determine whether communication sessions are currently active to at least two communication session servers, and which is configured to receive respective challenge responses from the at least two communication session servers which indicate one or more active communication sessions controlled by the respective communication sessions server or indicate that such communication sessions currently do not exist; and
a response unit which is configured to send a first response which indicates one or more active communication sessions controlled by the at least two communication session servers or indicates that such communication sessions currently do not exist;
wherein the response unit is configured to send s second response which indicates one or more active communication sessions, controlled by the at least two communication session servers, which were not indicated in the first response; and
wherein the communication sessions indicated in the second response which were not indicated in the first response contain one or more communication sessions which at least one of were not active and did not fulfill the one or more conditions at the time of the transmission of the first response.

14. The communication session information server as claimed in claim 13, wherein the received request is a request from a communication session participant appliance and the response unit is configured to send the first response to the communication session participant appliance.

15. The communication session information server as claimed in claim 13, wherein the received request contains one or more conditions for active communication sessions which are to be ascertained and the first response indicates only such active communication sessions as fulfill the one or more conditions or indicates that such communication sessions currently do not exist.

16. The communication session information server as claimed in claim 15, wherein the one or more conditions relate to at least one of a presence information item and a location information item.

17. The communication session information server as claimed in claim 15, further comprising:
a condition checking unit which is configured to check whether the one or more active communication sessions which are controlled by the respective communication session server and which are indicated in the respective challenge responses from the at least two communication session servers fulfill the one or more conditions; and
wherein the response unit is configured to form the first response such that it indicates only such active communication sessions as fulfill the one or more conditions or indicates that such communication sessions currently do not exist.

18. The communication session information server as claimed in claim 13, wherein the response unit is configured to send a third response which indicates that one or more of the active communication sessions indicated in at least one of the first and second response are at least one of no longer active and no longer fulfill the one or more conditions at the time of the transmission of the third response.

19. The communication session information server as claimed in claim 13, wherein indicating a communication session comprises at least one of a group address for the communication session being specified and participant addresses for the communication session being specified.

20. The communication session information server as claimed in claim 13, wherein the communication session information server is set up such that at least one article from the group comprising:
request,
first response,
second response,
third response,
is transmitted by means of a message in line with a communication control protocol.

21. The communication session information server as claimed in claim 20, wherein the communication control protocol is one of the following:
Session Initiation Protocol SIP,
RealTime Control Protocol RTCP,
HyperText Transport Protocol http,
File Transfer Protocol FTP,
Simple Mail Transfer Protocol SMTP.

22. The communication session information server as claimed in claim 13, wherein the communication sessions are those in which communication is effected by means of realtime media streams.

23. The communication session information server as claimed in claim 13, wherein the communication sessions are telecommunication conference sessions.

24. The communication session information server as claimed in claim 23, wherein the telecommunication conference sessions are Push-to-Talk over Cellular telecommunication conference sessions.

\* \* \* \* \*